United States Patent
Shomo

(10) Patent No.: US 8,028,908 B2
(45) Date of Patent: Oct. 4, 2011

(54) SYSTEMS AND METHODS FOR THE SECURE CONTROL OF DATA WITHIN HETEROGENEOUS SYSTEMS AND NETWORKS

(76) Inventor: Patrick Shomo, Huntingtown, MD (US)

(*) Notice: Subject to any disclaimer, the term of this patent is extended or adjusted under 35 U.S.C. 154(b) by 1087 days.

(21) Appl. No.: 11/743,082

(22) Filed: May 1, 2007

(65) Prior Publication Data

US 2007/0256117 A1     Nov. 1, 2007

Related U.S. Application Data

(60) Provisional application No. 60/796,986, filed on May 1, 2006.

(51) Int. Cl.
    *G06K 7/00* (2006.01)
(52) U.S. Cl. ........................ 235/435; 235/375
(58) Field of Classification Search ............ 235/435, 235/375; 726/4–6, 27; 713/167
See application file for complete search history.

(56) References Cited

U.S. PATENT DOCUMENTS

| | | | |
|---|---|---|---|
| 6,275,825 B1 | 8/2001 | Kobayashi et al. | |
| 6,324,537 B1 | 11/2001 | Moran | |
| 6,950,824 B1* | 9/2005 | Babiskin et al. | 707/694 |
| 6,978,366 B1 | 12/2005 | Ignatchenko et al. | |
| 7,047,407 B2* | 5/2006 | Itoh et al. | 713/168 |
| 7,092,914 B1 | 8/2006 | Shear et al. | |
| 7,110,983 B2 | 9/2006 | Shear et al. | |
| 7,120,932 B2 | 10/2006 | Lockhart et al. | |
| 7,134,022 B2* | 11/2006 | Flyntz | 713/182 |
| 7,143,066 B2 | 11/2006 | Shear et al. | |
| 2003/0009685 A1* | 1/2003 | Choo et al. | 713/200 |
| 2003/0172109 A1* | 9/2003 | Dalton et al. | 709/203 |
| 2004/0223615 A1* | 11/2004 | Dhawan | 380/261 |
| 2005/0055554 A1 | 3/2005 | Sion et al. | |
| 2006/0229997 A1 | 10/2006 | Luo et al. | |
| 2007/0005780 A1* | 1/2007 | Hanson | 709/229 |
| 2007/0061456 A1 | 3/2007 | Waris et al. | |

* cited by examiner

*Primary Examiner* — Ahshik Kim
(74) *Attorney, Agent, or Firm* — Sutherland Asbill & Brennan LLP

(57) ABSTRACT

A system and method for managing data rights is disclosed. A label associated with a data object is received and one or more predefined rules for the conversion of the label to a universal label having a universal format. The label is converted into the universal label at least in part by electronically mapping information associated with the label to one or more data fields associated with the universal label based at least in part on the one or more predefined rules.

20 Claims, 11 Drawing Sheets

|  | Level | Compartments | Release |
|---|---|---|---|
| Originator Mappings |  |  |  |
| Orig = 1 |  |  | 100, 200 |
| Orig = 2 |  |  | 100, 200, 300 |
| Orig = 3 |  | 38 | 100, 400 |
| Level Mappings |  |  |  |
| Level = 1 | 127 | 34, 36 |  |
| Level = 2 | 100 | 34, 36 |  |
| Level = 3 | 90 | 34, 36 |  |
| Level = 4 | 60 |  |  |

SYSTEMS AND METHODS FOR THE SECURE CONTROL OF DATA WITHIN HETEROGENEOUS SYSTEMS AND NETWORKS

CROSS REFERENCE TO RELATED APPLICATION

This application claims priority from U.S. Provisional Application No. 60/796,986, entitled "A System for Secure Storage, Evaluation, Control, and Dissemination of Data Within Heterogeneous Computer Systems and Networks," which was filed on May 1, 2006, and is incorporated by reference herein in its entirety.

FIELD OF THE INVENTION

The present invention relates generally to data security, and, more particularly, to data security within heterogeneous systems and networks.

BACKGROUND OF THE INVENTION

There has long existed a need for the secure handling of data within computer systems and networks. In the modern information society, it is very easy to distribute and communicate information in electronic form. The ease of communicating information has brought about new difficulties regarding the security and access control of electronic information and data. Various prior art information assurance techniques and systems have been developed that attempt to identify and counteract actual or potential threats to the confidentiality, integrity, and availability of data within systems and networks; however, a number of limitations are inherent in these prior art techniques and systems.

One technique that is currently in practice for securing information is called mandatory access control (MAC). In MAC, a data marker, or label, is associated with an item of data, or object, in electronic storage. The associated label is utilized to provide a representation of an abstract security level for the data object. For example, the associated label may identify the data object as "proprietary" data or as "confidential" data. The associated label may also specify control or compartment specifications and/or release markings. A control or compartment specification may specify compartments that are permitted to access the data. For example, a compartment specification may specify that members of "Project X" are permitted to access the data. A release marking may specify organizations or groups that are permitted to access the data such as, for example, the "Accounting Office," "Executive Management," or "Not for Release to Contractors."

Labels that are associated with a data object are later compared to the security level of a subject when a request for the data is made. The subject is typically a user, a software program, a network station, or another system. The object data is released only when the security level of the subject equals or exceeds that of the object. In other words, the object is only released when the security level of the subject dominates that of the object.

Although several information assurance techniques, including MAC, exist for marking data, the practical applicability of current data marking, control, and evaluation techniques are often fraught with technical and organizational problems. Specifically, existing storage and marking techniques are typically specific to a particular operating system and/or software vendor. As a result, object data that is marked utilizing a first marking and evaluation technique cannot be accessed by a system that utilizes a second marking and evaluation technique. In fact, there may exist divergent methods for marking and evaluation within a single operating environment depending on the file storage system and software in use. The combination of multiple operating system and software packages results in the marking of data objects according to a myriad of techniques that are incompatible with one another.

Additionally, the design, engineering, and implementation of information assurance systems is time consuming and expensive largely due to the mapping and integration of their complex capabilities into a comprehensive security approach, or policy. The time and cost needed to successfully implement an information assurance system is also affected by the experience and knowledge of the developers and engineers responsible for its development, testing, and deployment. In many cases the development staff is aware of the core functional requirements of their specific application such as, for example, the means for creating a report using underlying business data; however, the development staff often possesses only rudimentary knowledge regarding the theory and practical application of information assurance techniques. This disconnect often results in ineffective security enforcement within the application, network or system, which can lead to excessive disclosure of protected information.

Additionally, many existing information assurance products are designed to protect simple file-based access solutions and do not take into account dynamically generated data or information. In other words, the existing systems can protect a stored file but cannot adequately protect data that is dynamically generated in real time.

Additional information assurance challenges exist in the Service Oriented Architectures ('SOA') that are rapidly gaining prominence within software developer communities. The methodologies behind SOA depend on numerous self-reliant and independent software capabilities or functions that make themselves available for other services and applications to access, update, and use. These independent services further complicate the information assurance landscape because each service is free to establish its own security methods and policy.

Another obstacle to the development and deployment of information assurance systems is the concern over the performance of the system. Existing architectures and software typically incur a non-trivial impact on overall system performance through the use of software and hardware intended to control access to network and system resources. These systems, which may be referred to as controlled interfaces or guard gateways, perform evaluation of data and labels before finally delivering data to a requesting entity. A controlled interface typically filters data as it is delivered, resulting in a computationally expensive operation that degrades overall system performs.

Accordingly, there is a need for improved systems and methods for the secure control of data within heterogeneous computer systems and networks.

SUMMARY OF THE INVENTION

According to one embodiment of the invention, there is provided a method for electronically managing data rights. A label associated with a data object may be received and one or more predefined rules for the conversion of the label to a universal label having a universal format may be obtained. The label may be converted into the universal label at least in part by electronically mapping information associated with the label to one or more data fields associated with the universal label based at least in part on the one or more predefined rules.

According to another embodiment of the invention, there is provided a system for electronically managing data rights. The system may include at least one database and at least one label maker. The at least one database may be configured to store one or more predefined rules for the conversion of a label associated with a data item to a label having a universal format. The at least one label maker may be configured (i) to receive the label, (ii) to obtain the one or more predefined rules from the database, and (iii) to convert the label into a universal label based at least in part on the one or more predefined rules.

Aspects of the invention described below may apply to both the method for electronically managing data rights and to the system for electronically managing data rights. According to an aspect of the invention, the data object may include static data or dynamically generated data. According to another aspect of the invention, one or more makers may be associated with the label prior to converting the label into a universal label. The one or more markers associated with the label may include data associated with one or more of a version of the label, declassification information for the label, and originator information for the label.

According to another aspect of the invention, the one or more predefined rules for the conversion of the label may be selected from a plurality of potential conversion rules. According to another aspect of the invention, the selection of the one or more predefined rules may be based at least in part on security information associated with the label. According to yet another aspect of the invention, the selection of the one or more predefined rules may be based at least in part on environmental information associated with the data object. According to yet another aspect of the invention, the one or more predefined rules and/or the plurality of potential conversion rules may be dynamically updated.

According to another aspect of the invention, the label may be a first label, the universal label may be a first universal label, and a second label associated with a subject seeking access to the data object may be received. One or more predefined rules for the conversion of the second label to a second universal label having the universal format may be obtained and the second label may be converted into the second universal label. The first universal label and the second universal may be evaluated and a determination may be made as to whether the subject is allowed to access the data object based at least in part on the evaluation.

According to another aspect of the invention, the evaluation of the first universal label and the second universal label may include a comparison of a security level associated with the first universal label to a security level associated with the second universal label. According to yet another aspect of the invention, the first label may be formatted according to a first security policy and the second label may be formatted according to a second security policy, and the first security policy may not be the same as the second security policy.

Other embodiments, objects, features and advantages of the invention will become apparent to those skilled in the art from the detailed description, the accompanying drawings and the appended claims.

BRIEF DESCRIPTION OF THE DRAWINGS

Figure 1:
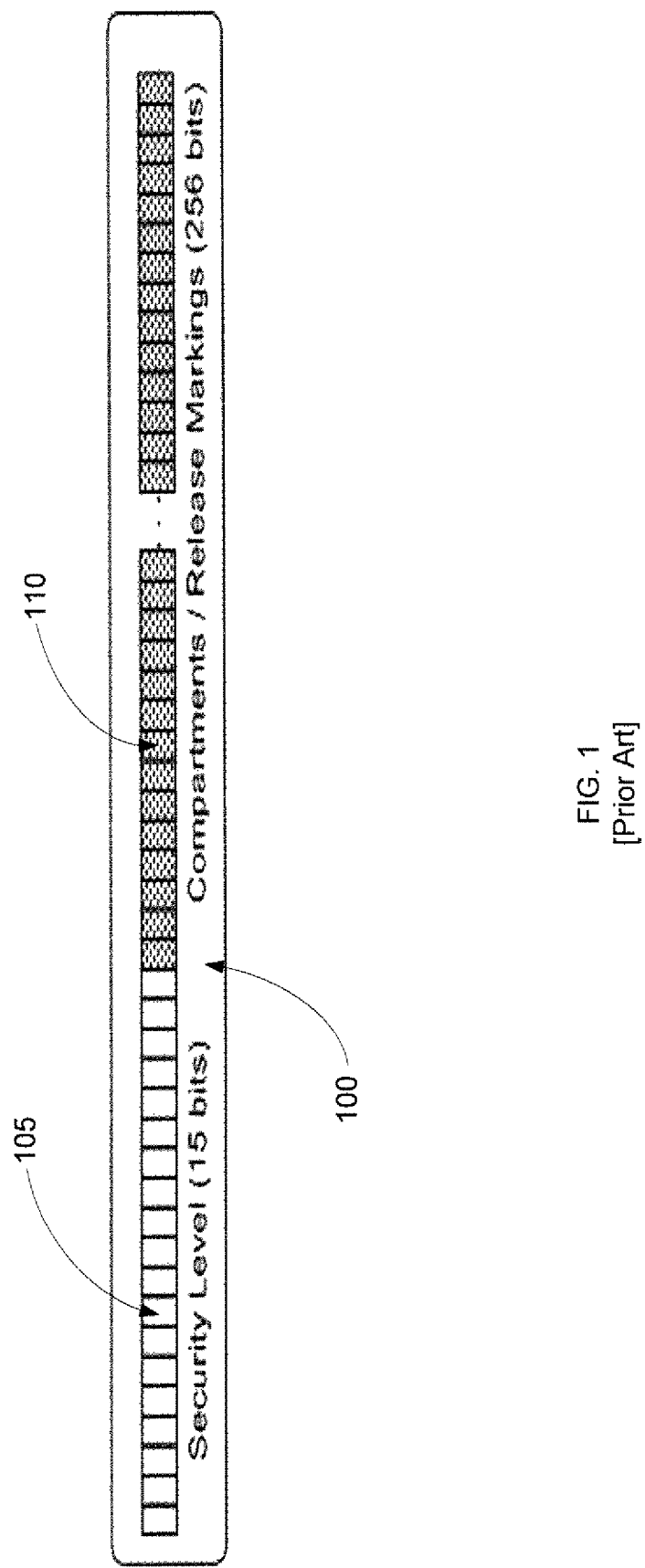

Having thus described the invention in general terms, reference will now be made to the accompanying drawings, which are not necessarily drawn to scale, and wherein:

FIG. 1 is a block diagram of a prior art label that may be utilized to provide controlled access to data.

Figure 2:
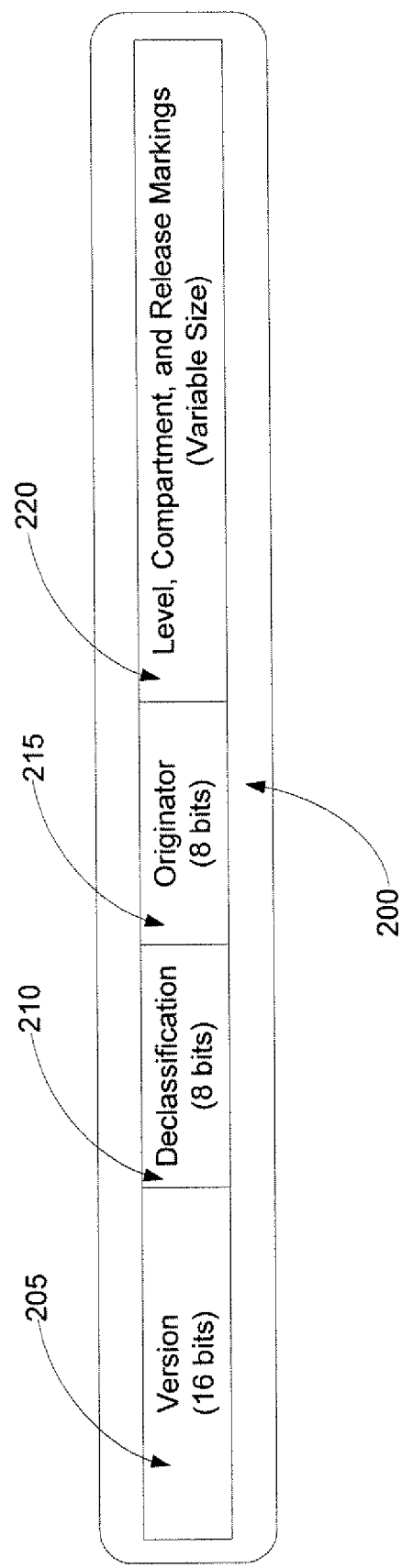

FIG. 2 is a block diagram of a label format with additional label markers, according to an illustrative embodiment of the invention.

Figure 3:
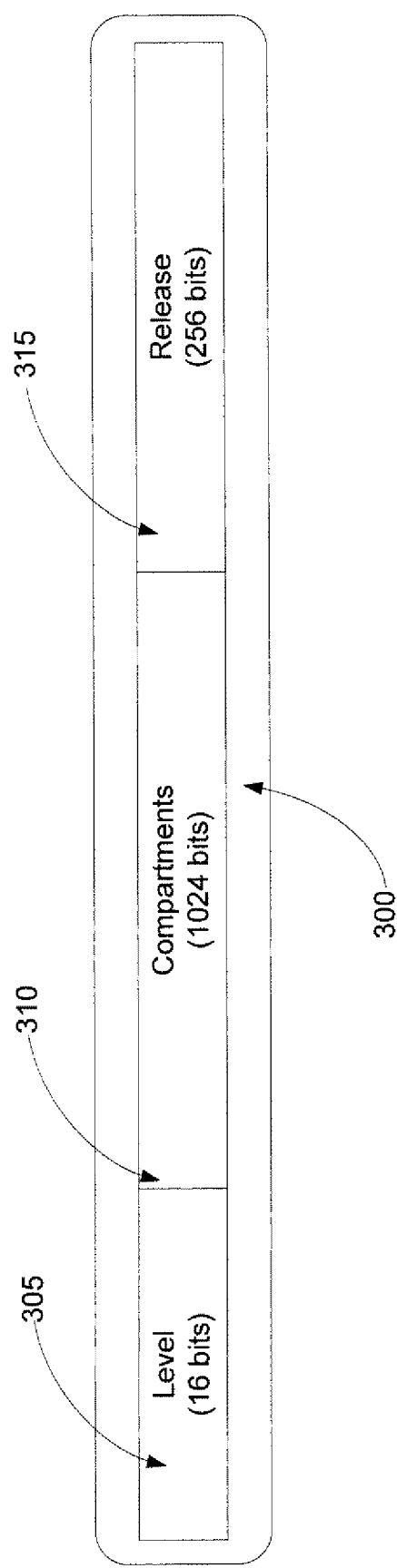

FIG. 3 is a block diagram of a universal label, according to an illustrative embodiment of the invention.

Figure 4:
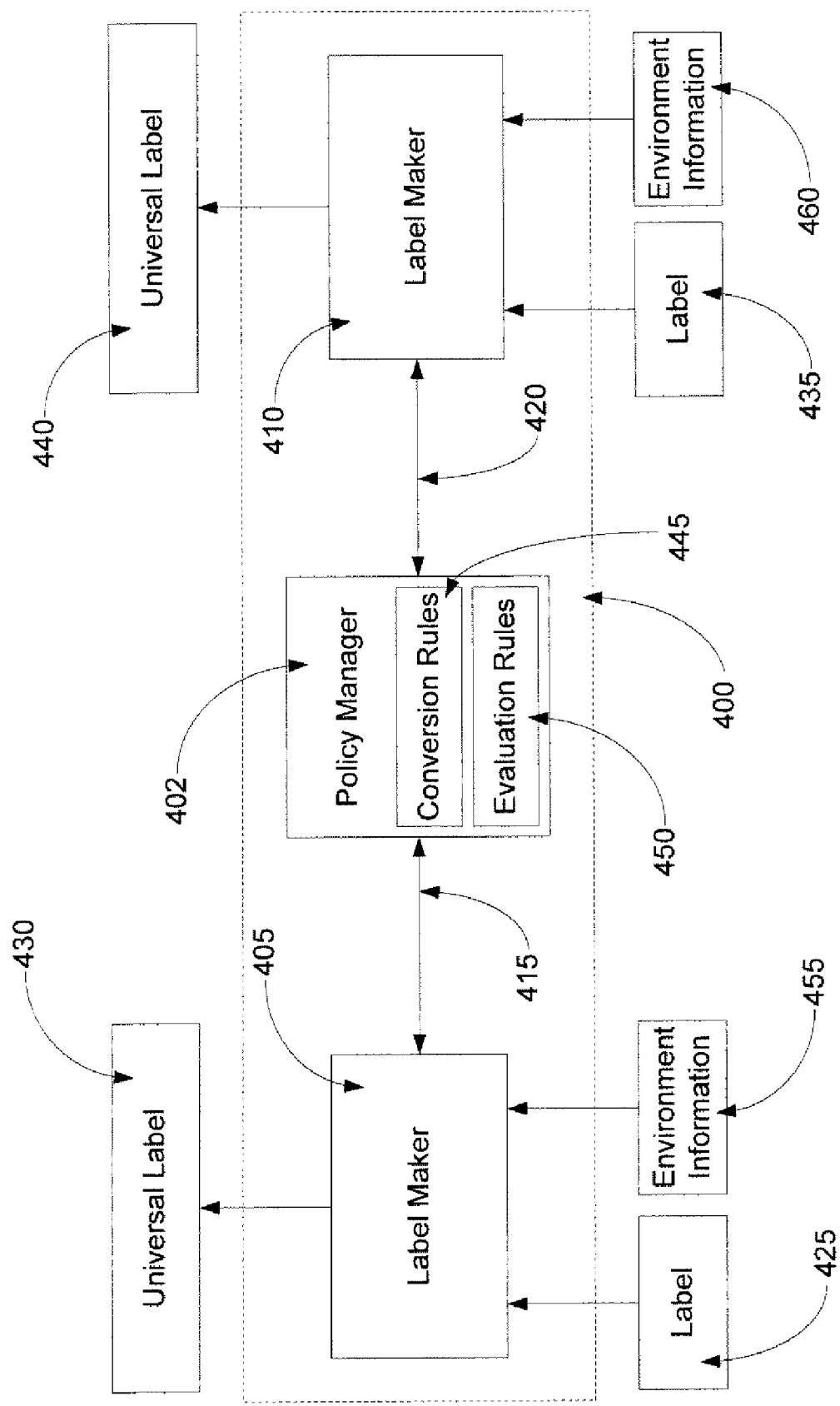

FIG. 4 is a block diagram of a label conversion system, according to an illustrative embodiment of the invention.

Figure 5:
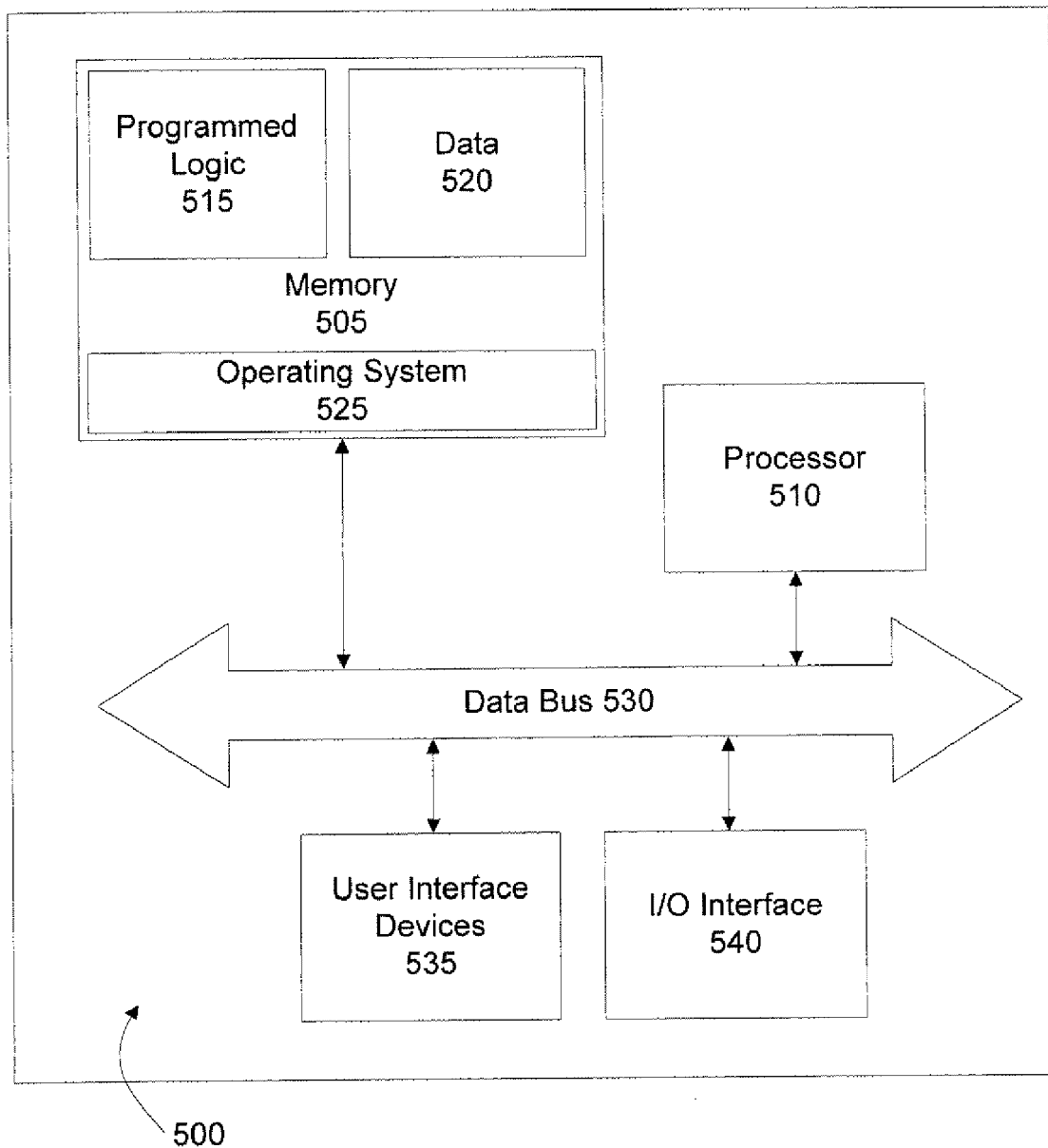

FIG. 5 is a is a block diagram of a control unit that may be utilized by respective components of the label conversion system of FIG. 4, according to an illustrative embodiment of the invention.

Figure 6:
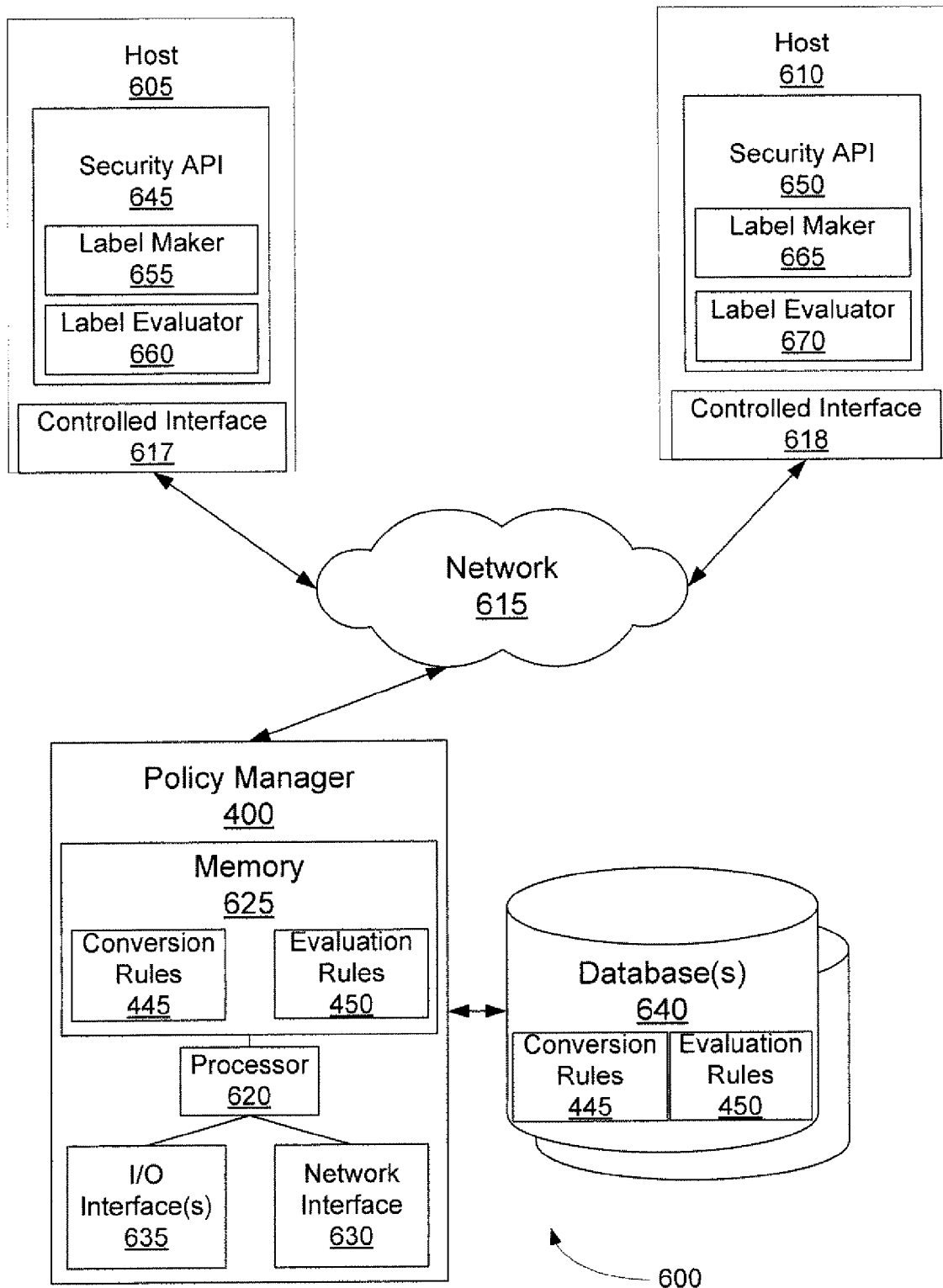

FIG. 6 is a schematic diagram of a heterogeneous network that converts and evaluates data labels, according to an illustrative embodiment of the invention.

Figure 7:
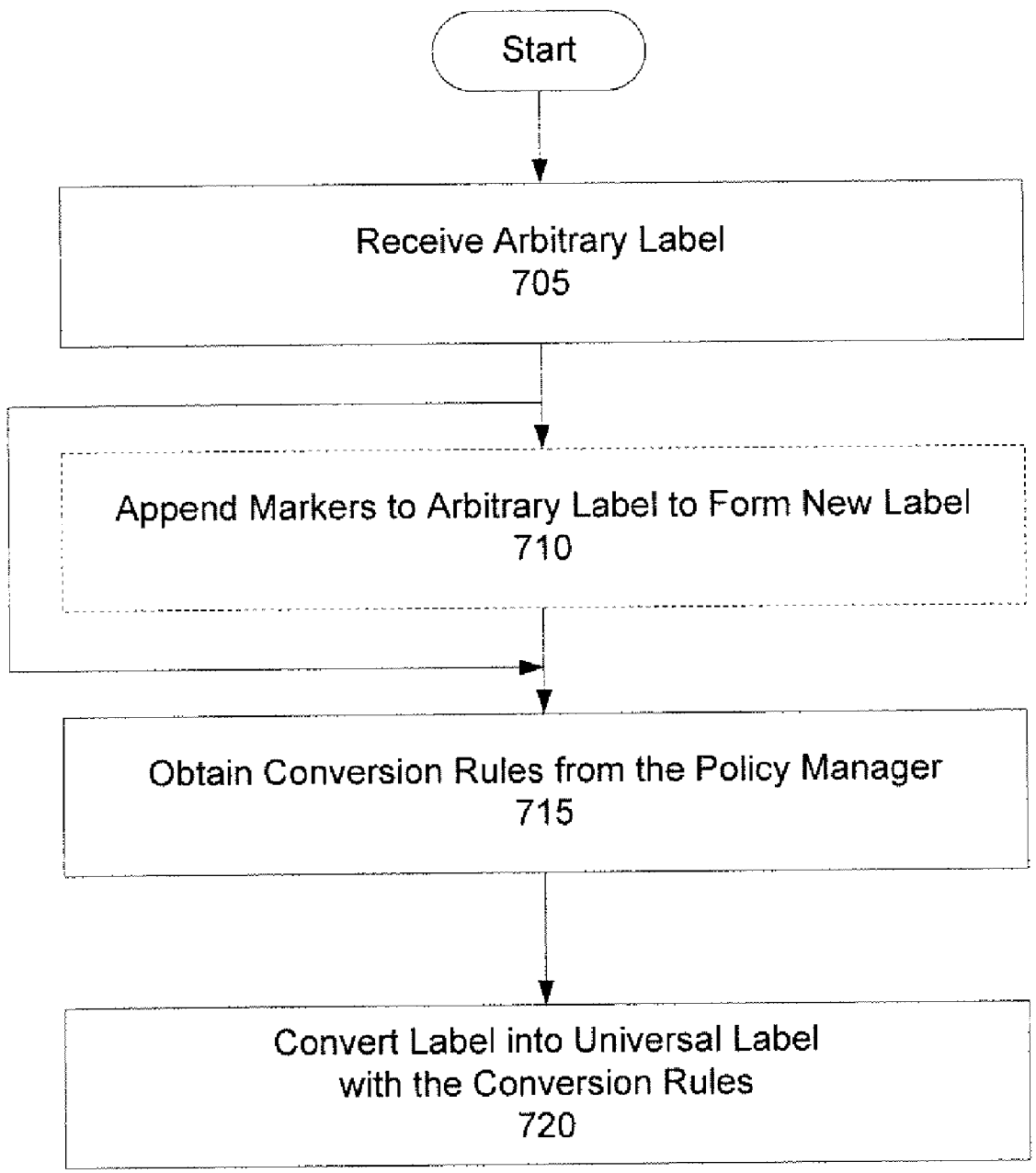

FIG. 7 is an exemplary flowchart of a method for performing a label conversion, according to an illustrative embodiment of the invention.

Figures 8A, 8B:
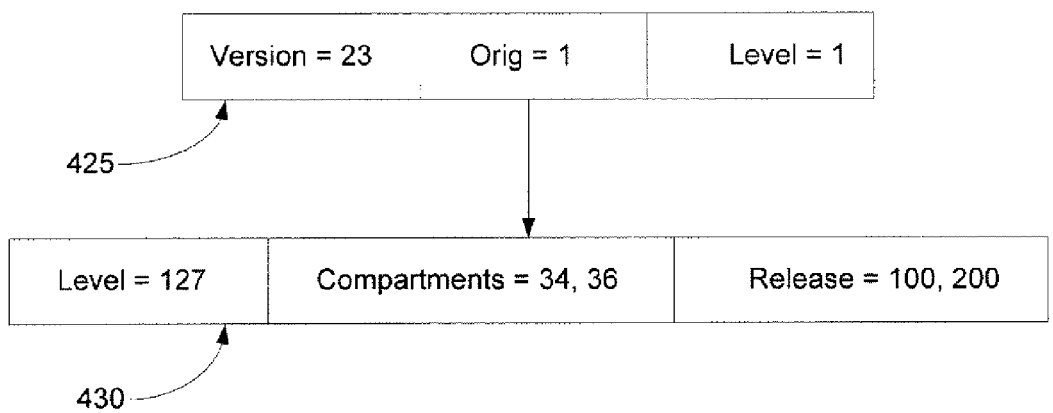

FIG. 8A is a table that depicts exemplary rules for a label conversion, according to an illustrative embodiment of the invention.

FIG. 8B is a block diagram illustrating an exemplary label conversion, according to an illustrative embodiment of the invention.

Figure 9:
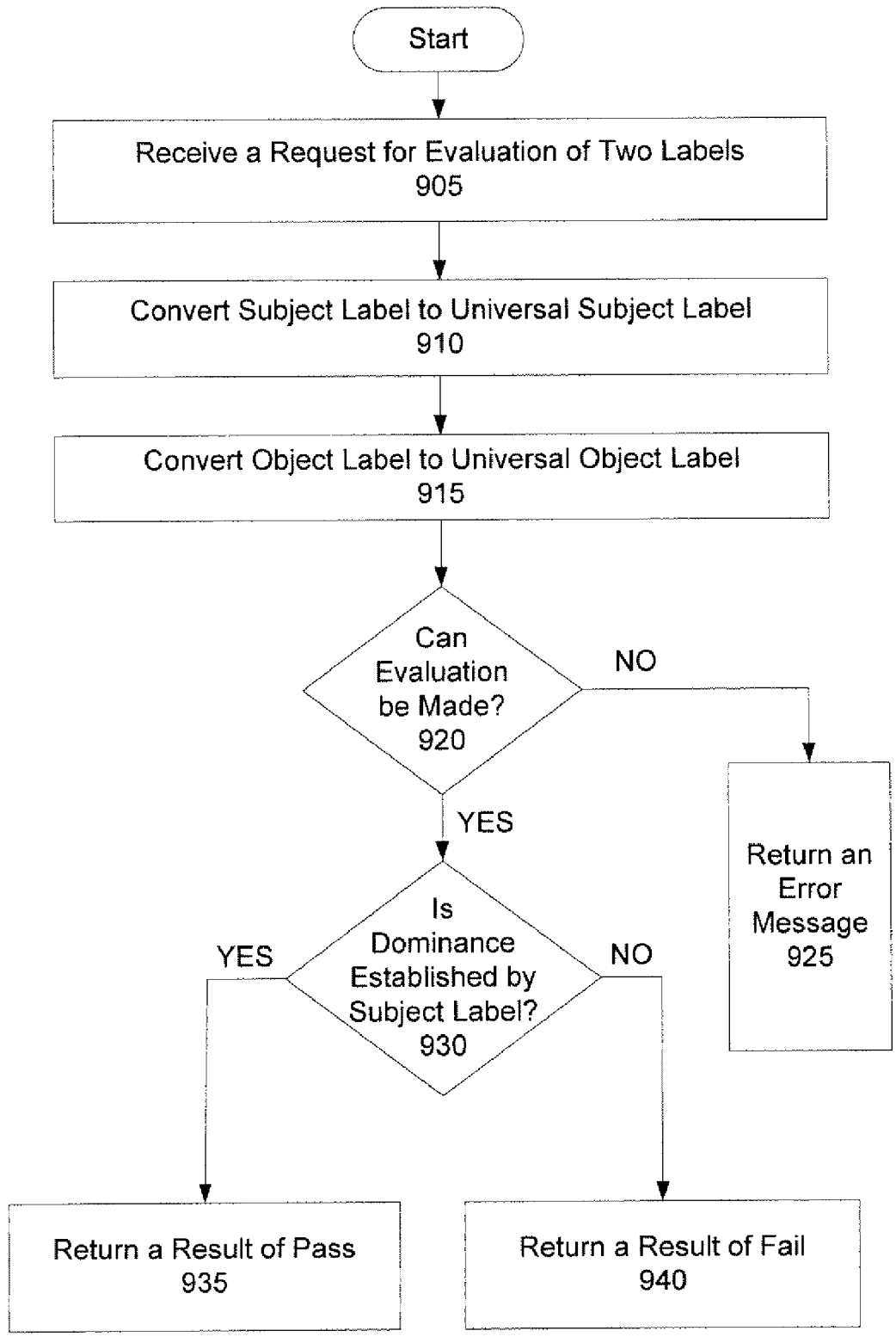

FIG. 9 is an exemplary flowchart of a method for evaluating labels, according to an illustrative embodiment of the invention.

Figure 10:
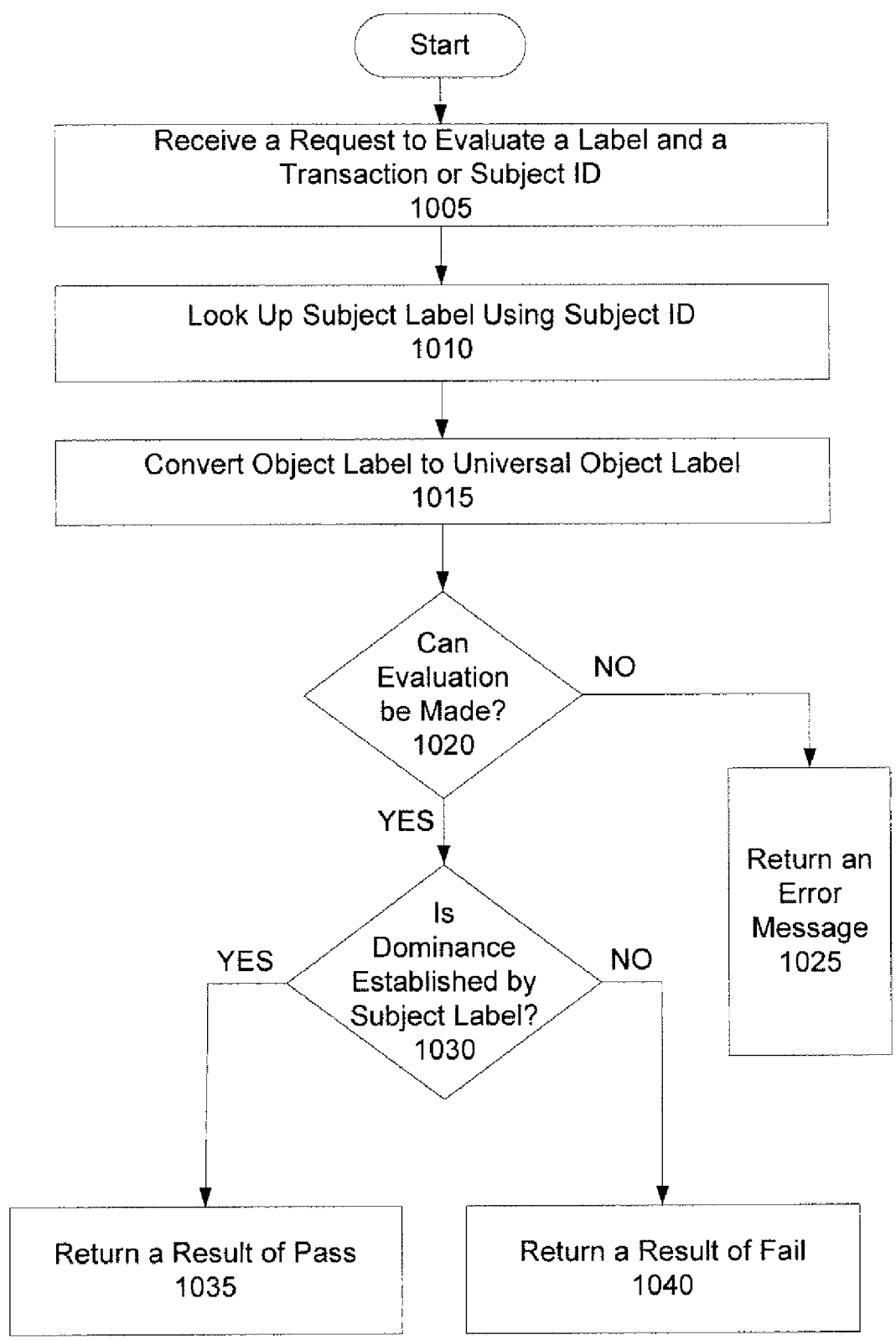

FIG. 10 is an exemplary flowchart of an alternative method for evaluating labels, according to an illustrative embodiment of the invention.

Figure 11:
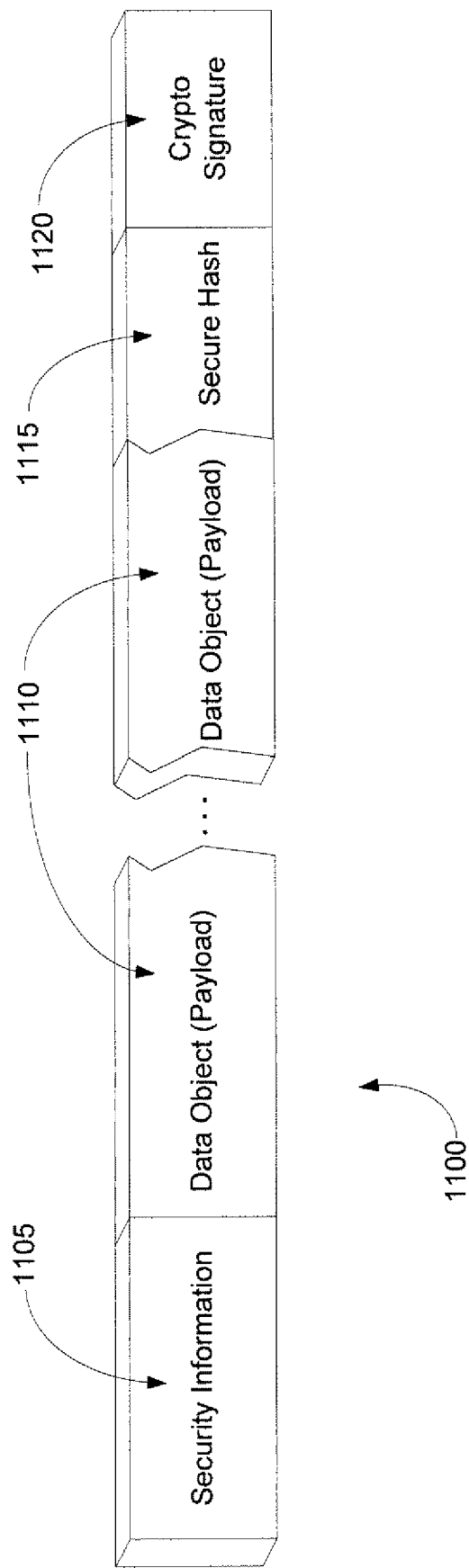

FIG. 11 is a block diagram illustrating a data storage structure, according to an illustrative embodiment of the invention.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF EMBODIMENTS OF THE INVENTION

Embodiments of the present inventions will now be described more fully hereinafter with reference to the accompanying drawings. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the invention are described below with reference to block diagrams of systems, methods, apparatuses and computer program products according to an embodiment of the invention. It will be understood that each block of the block diagrams, and combinations of blocks in the block diagrams, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functionality of each block of the block diagrams, or combinations of blocks in the block diagrams discussed in detail in the descriptions below.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

Accordingly, blocks of the block diagrams support combinations of means for performing the specified functions, combinations of steps for performing the specified functions and program instruction means for performing the specified functions. It will also be understood that each block of the block diagrams, and combinations of blocks in the block diagrams, can be implemented by special purpose hardware-based computer systems that perform the specified functions or steps, or combinations of special purpose hardware and computer instructions.

Disclosed are systems and methods for providing information assurance and managing data access rights. According to an aspect of the invention, data access rights may be managed by a technique that is compatible with a plurality of data rights management architectures. Thus, the problems posed by multiple incompatible information assurance techniques and/or data rights management architectures may be solved. According to an embodiment of the invention, a label associated with a managed item of data may be received. One or more predefined rules for the conversion of the label to a label having a standard, common, or universal format may be obtained, and the label may be converted into a universal label. The universal label may be evaluated in order to determine whether the associated item of data may be released to an entity that requests access to the data. It will be appreciated that label conversion and/or evaluation may be performed by a plurality of security systems and/or devices that are in communication with one another via a network. Accordingly, one or more security policies may be used to enforce and/or manage data rights in a logically centralized manner. Additionally, total system performance may be improved by performing conversion and/or evaluation by a plurality of security systems and/or devices.

For purposes of this disclosure, the term evaluation will be used to refer to a process utilized to determine whether one or more managed items of data, or data objects, will be released to an entity, or subject, that requests the one or more managed items of data. It will be appreciated that a data object may be any digital data such as, for example, a text document, a multimedia document, a web page, a sound file, a video file, or a database file. It will further be appreciated that a data object may include any number of data items, and that a data object may be a static data object or a dynamically generated data object.

Evaluation may be performed on one or more security markers or labels that are associated with a data objects. Labels may encapsulate various security and/or identification information associated with a data object such as, for example, a security level and information associated with the compartmentalization and releasability of the data object. The information contained in a label may be stored as one or more binary tags or bit field that may be mapped to associated security and/or identification information. For example, a bit field of "0001" may be mapped to a security level of "confidential."

Referring to FIG. 1, there is shown a block diagram of a prior art label 100 that may be utilized to provide controlled access to a data object. The prior art label 100 depicted is a binary Compartmented Mode Workstation Label (CMW), as developed by the United States Department of Defense. The CMW label 100 may include two major portions or fields: a security level 105 and a follow-on portion 110. Each of the major portions or fields may include any number of bits. As shown in FIG. 1, the security level 105 portion may include 15 bits and the follow-on portion 110 may include 256 bits. The security level 105 may be the first portion, and it may include information associated with a security level for a data object. The security level 105 may also be referred to as a sensitivity level or a classification portion. The security level 105 may describe the levels of security at which a data object is protected. In the example of a CMW label 100, the information contained in the security level 105 may correlate to or map to an approved security classification of the Department of Defense. These security classifications may include, for example, top secret, secret, for official use only, and unclassified. The follow-on portion 110 may include information that assists in accurate data labeling and/or information that assists in preventing data overclassification. For example, the follow-on portion 100 may include information relating to compartments and/or release markings for the data object, as will be understood by those skilled in the art. The compartments and release markings may include special handling keywords for identifying and/or managing access to the data object. For example, compartments information may include special handling keywords for the data object such as, for example, "orange" and "blue." The compartments information may specify compartments that a subject requesting access to the data also must be associated with in order to gain access to the data. As another example, the release markings information may specify organizations or groups that are permitted to access the data.

When a subject requests a marked or labeled data object, an evaluation process may be undertaken in which a security level of the subject is compared to the security level of the data object. For example, a label associated with the subject may be compared to the label associated with the data object. The subject may be granted access to the data object if dominance is established by the subject. Dominance may be established if the security level of the subject is equal to or greater than the security level of the data object. Additionally, a determination that dominance has been established may require that the subject label includes compartments and release markings that match those of the data object.

It will be understood that the CMW label 100 of FIG. 1 is merely one example of a prior art label. Many different marking standards exist in the prior art. According to an aspect of the present invention, a plurality of distinct label formats may be utilized in managing access rights to one or more data objects. For example, a first managed data object may be marked or labeled according to a first marking standard and a second managed data object may be marked or labeled according to a second marking standard. For purposes of this disclosure, each of the existing prior art marking standards or labeling formats may be referred to as an arbitrary label format. It will be understood that the term arbitrary label format may additionally be used to refer to labels that are created with a marking standard that has not yet been developed or implemented. According to an aspect of the invention, a label having an arbitrary label format may be converted into a label having a universal label format, as explained in greater detail below with reference to FIGS. 3, 4, 6 and 7.

FIG. 2 is a block diagram of a label format with additional label markers, according to an illustrative embodiment of the invention. The new label format 200 of FIG. 2 may include one or more new or additional markers that are associated with an arbitrary label format. The arbitrary label format may be any arbitrary label format such as, for example, the label format depicted in FIG. 1. The new label format 200 may allow for a more efficient conversion of an arbitrary label into a universal label, as explained in greater detail below with reference to FIGS. 4, 6 and 7.

It will be appreciated that the new label format 200 may include any number of additional markers. As shown in FIG. 2, the new label format 200 may include three additional markers that respectively denote a version information, declassification guidance information, and originator information for an associated data object. Accordingly, the new label format 200 may include four major portions or fields: a version field 205, a declassification field 210, an originator field 215, and an arbitrary label field 220. It will be appreciated that each of the portions or fields may include any number of data bits that are utilized to manage access rights to the data object. As shown in FIG. 2, the version field 205 may include 16 bits, the declassification field 210 may include 8 bits, and the originator field 215 may include 8 bits. The version field 205 may denote a particular version, revision, or generation of a label. The version field 205 may be used to identify the format of a label. For example, the version field 205 may identify a label as a CMW label. The data bits contained in the version field 205 may be arranged in any appropriate configuration that allows a label format to be identified. For example, the data bits contained in the version field 205 may denote an integer value that designates the label format. As another example, a bit position of the data bits may map to a label format. For example, a one in the first bit position of the data bits may denote a first label format, a one in the second bit position may denote a second label format, and so on. The version field 205 may further assist in the evaluation of labels having multiple formats. For example, the version field of a first label may identify a first label format and the version field of a second label may identify a second label format. Given the version fields of the two labels, one or more rules may be utilized to facilitate a comparison or evaluation of the two labels. The version field 205 may also be used to identify different generations of the same label format. In such a situation, the label format between two labels may match; however, the security parameters associated with the two labels may not be compatible with one another. For example, a security policy may have occurred between the generation of the first label and the generation of the second label. As an example, the first label may include a compartment designation of "orange"; however, prior to the generation of the second label, compartment "orange" may have been split into compartments "red" and "blue." Accordingly, the second label may include compartment designations of "red" and "blue." In other words, the formats of the two labels may match, but the compartment information included in the two labels may differ. Accordingly, one or more rules may be utilized in order to perform a comparison or evaluation of the two labels. The version field 205 may include information that facilitates the identification of the different versions of the same label formats, thereby allowing a comparison or evaluation of the two labels to be made.

The declassification field 210 may be used to identify one or more declassification rules or sets of declassification rules associated with the data object. For example, the declassification field 210 may contain one or more declassification rules established by an entity or organization that established the security policy for the data object. As an example of these one or more declassification rules, a rule may be established that creates an automatic declassification or a reduction in classification or special handling for the data object upon the occurrence of a predefined date or event. As with the version field 205, the data bits contained in the declassification field 210 may be arranged in any appropriate configuration that allows one or more declassification rules to be identified. For example, the data bits contained in the declassification field 210 may denote an integer value that designates one or more declassification rules or groups of declassification rules. As another example, a bit position of the data bits may map to one or more declassification rules or groups of declassification rules in a similar manner as that explained above for the version field 205.

The originator field 215 may be used to identify the source of the data object. It will be appreciated that information associated with many different types of sources may be included in the originator field 215. For example, the originator field 215 may include an indication that the data object originated in a particular nation. As another example, the originator field 215 may include information that identifies a data collector or sensor that was utilized to obtain data contained within the data object. As with the version field 205 and the declassification field 210, the data bits contained in the originator field 215 may be arranged in any appropriate configuration that allows the source of the data object to be identified. For example, the data bits contained in the originator field 215 may denote an integer value that designates a source of the data object. As another example, a bit position of the data bits may map to a source in a similar manner as that explained above for the version field 205.

The arbitrary label field 220 may include an arbitrary label such as, for example, the CMW label 100 depicted in FIG. 1. It will be appreciated that the arbitrary label may be formatted according to virtually any arbitrary label format. Additionally, it will be appreciated that the arbitrary label may remain unchanged. In other words, the arbitrary label may be subsumed into the new label format 200.

FIG. 3 is a block diagram of a universal label format 300, according to an illustrative embodiment of the invention. A universal label may be formatted according to this standard, common, or universal label format 300. A universal label formatted according to the universal label format 300 may also be referred to as a superlabel, a standard label, or a common label. The universal label format 300 may provide a format that allows the evaluation and/or combination of incompatible arbitrary labels. According to an aspect of the invention, arbitrary labels and/or labels formatted according to the new label format 200 may be converted into the universal label format 300, as explained in greater detail below with reference to FIGS. 4, and 6-8. Following conversion, an evaluation and/or combination of one or more universal labels may be made.

It will be understood that a label formatted according to a universal label format 300 may include any number of fields. With reference to FIG. 3, the universal label format 300 may include a security level field 305, a compartments field 310, and a release field 315. Each of these fields may include any number of data bits. For example, as shown in FIG. 3, the security level field 305 may include 16 bits, the compartments field 310 may include 1024 bits, and the release field 315 may include 256 bits. These fields may be similar to those described above with reference to the CMW label 100 of FIG. 1. It will be understood that the data bits contained in each field may be arranged in any appropriate configuration to identify any security or other information contained within the field. For example, the data bits may denote an integer value or a bit position of the data bits may map to particular information, as explained in greater detail above with reference to FIGS. 1 and 2. The security level field 305 may identify one or more security levels for a data object such as, for example, "secret," "restricted," and/or "top secret." In other words, the security level field 305 may describe the levels of security at which a data object is protected. The compartments field 310 and the release field 315 may identify special handling words for the data object. For example, the compartments field 310 may identify compartments that a subject requesting access to the data object also must be associated with in order to gain access to the data object. As another example, the release field 315 may identify organizations or groups that are permitted to access the data.

Although the arbitrary label, the label with a new label format 200, and the universal label described above are described as labels associated with a data object, it will be understood that a subject may also have a label associated with it that denotes the security level of the subject. During an evaluation process, a label associated with a subject may be compared to a label associated with a data object in order to determine whether or not the subject will be allowed access to the data object. It will be appreciated that an arbitrary label associated with a subject may be converted to a universal label format 300 in a similar manner to that described above for a label associated with a data object.

FIG. 4 is a block diagram of a label conversion system 400, according to an illustrative embodiment of the invention. The label conversion system 400 may include a policy manager 402 and one or more label makers 405, 410 in communication with the policy manager. As shown in FIG. 4, a first label maker 405 may be in communication with the policy manager 405 via a first communications link 415 and a second label maker 410 may be in communication with the policy manager 405 via a second communications link 420. Each of the label makers 405, 410 may perform a conversion of an arbitrary label into a universal label. For example, the first label maker 405 may convert a first arbitrary label 425 into a first universal label 430. Similarly, the second label maker 410 may convert a second arbitrary label 435 into a second universal label 440. It will be appreciated that an arbitrary label may be converted into the new label format 200 prior to it being converted into a universal label format 300. It will also be appreciated that both labels associated with data objects, or object labels, and labels associated with subjects, or subject labels, may be convened by the label makers 405, 410. For example, the first arbitrary label 425 may be an arbitrary object label that is converted into a universal object label 430 by the first label maker 405. Similarly, the second arbitrary label 435 may be an arbitrary subject label that is convened into a universal subject label 440 by the second label maker 410.

The conversion process utilized by each of the label makers 405, 410 may be similar. Accordingly, the conversion process will now be described with reference only to the first label maker 405, which will be referred to as the label maker 405. The label maker 405 may convert an arbitrary label 425 into a universal label 430 in accordance with one or more conversion rules 445. The one or more conversion rules 445 may control or specify the information that is included in each of the fields of a universal label 430 based at least in part on the information that is included in the fields of either an arbitrary label 425 or an arbitrary label that has been converted into the new label format 200. As shown in FIG. 4, the one or more conversion rules 445 may be stored in one or more memories associated with the policy manager 402; however, it will be understood that the one or more conversion rules 445 may additionally or alternatively be stored in one or more memories associated with other components of the label conversion system 400 such as, for example, the label maker 405.

During the conversion of an arbitrary label 425 into a universal label 430, the label maker 405 may obtain relevant conversion rules 445 from the policy manager 402 and utilize the relevant conversion rules 445 in the conversion. For example, the policy manager 402 may receive a request from the label maker 405 for relevant conversion rules 445. The policy manager 402 may also receive information associated with the arbitrary label 425 from the label maker 405 such as, for example, security level information, compartments information, and/or release information. It will be appreciated that if a label having a new label format 200 is being converted into a universal label 430, then the policy manager 402 may receive information associated with the label having the new label format 200 such as, for example, version information, originator information, and or security level information. The policy manager 402 may utilize the received information to identify one or more relevant conversion rules 445. The one or more relevant conversion rules 445 may be communicated to the label maker 405, and the label maker 405 may convert the arbitrary label 425 into a universal label 425 utilizing the one or more relevant conversion rules 445.

It will further be appreciated that the identification of relevant or appropriate conversion rules 445 by the policy manager 402 may additionally or alternatively be based at least in part on one or more characteristics of the environment of the arbitrary label 425, In other words, environment information 455 may be utilized by the policy manager 402 to identify relevant conversion rules 445. As shown in FIG. 4, the environment information 455 may be obtained and/or collected by the label maker 405 or a device associated with the label maker 405 and communicated to the policy manager 402; however, it will be understood that the environment information 455 may be obtained by other components of the label conversion system 400 such as, for example, the policy manager 402. The environment information 455 may include any information relating to or associated with the environment in which the arbitrary label 425 was created such as, for example, a storage location of the data object (e.g., a particular database, memory location, system, or content-addressable-storage system, etc.), data type information for the data object (e.g., a file type, a file length, a file size, a file name, a file creation date, a file last edit date, etc.), and/or any information concerning a system or operating environment that is processing the data object (e.g., a process ID, a process owner, an application name, an application type, etc.).

Environment information 455 may be utilized in conjunction with or independently of information contained in or referenced by an arbitrary label 425. For example, environment information 455 may be utilized to identify one or more appropriate conversion rules 445 for an arbitrary label 425 or a label with the new label format 200 when the arbitrary label 425 or label with the new label format 200 does not include any label markings or does not include sufficient label markings to identify appropriate conversion rules 445. As one example, environment information 455 may be utilized to identify relevant conversion rules 445 for a label that is missing label markings for the version field and the originator field. The relevant conversion rules 445 may then be utilized by the label maker 405 in the generation of a universal label 430.

It will be appreciated that the label maker 405 may optionally convert an arbitrary label 425 into a label having the new label format 200 and may then convert the label having the new label format 200 into a universal label 430. The label maker 405 may utilize one or more relevant conversion rules 445 for the generation of the label having the new label format 200. The one or more relevant conversion rules 445 may be stored in one or more memories associated with the policy manager 402; however, it will be understood that the one or more relevant conversion rules 445 may be stored in one or more memories associated with other components of the label conversion system 400 such as, for example, in a memory associated with the label maker 405. The one or more relevant conversion rules 445 may be utilized by the label maker 405 to determine the data bits that are stored in the new makers of the label having the new label format 200. Accordingly, the label having the new label format 200 may be generated by the label maker 405.

Following the conversion of an arbitrary object label into a universal object label and the conversion of an arbitrary subject label into a universal subject label, an evaluation process may be conducted for the two labels. As an example, the universal object label 430 may be generated by the first label maker 405 from the first arbitrary label 425 and first environment information 455. Similarly, the universal subject label 440 may be generated by the second label maker 410 from the second arbitrary label 435 and second environment information 460. An evaluation of the universal object label 430 and the universal subject label 440 may be performed by a component of the label conversion system 400 such as, for example, the policy maker 402, or the evaluation may be performed by an entity or system in communication with the label conversion system 400. One or more relevant evaluation rules 450 may be utilized in the evaluation. Similar to the conversion rules 445, the evaluation rules 450 may be stored in one or more memories associated with one or more components of the label conversion system 400 such as, for example, in a memory associated with the policy manager 402. As explained in greater detail below with reference to FIGS. 9 and 10, the evaluation may determine whether or not dominance over the universal object label 430 is established by the universal subject label 440. If dominance is established by the universal subject label 440, then a subject associated with the universal subject label 440 may be allowed to access the data object.

Additionally, the label conversion system 400 may convert two arbitrary labels into universal labels and combine the two universal labels. The two arbitrary labels may have different label formats or may be different generations of the same label format. Once the two arbitrary labels have been converted into universal labels, the two universal labels may have the same label format, allowing the two universal labels to be combined together. For example, a first arbitrary label may be associated with a first data object, and a second arbitrary label may be associated with a second data object. The first arbitrary label may be formatted according to a first label format, and the second arbitrary label may be formatted according to a second label format. Additionally, the security information contained within the two labels may vary. For example, the first arbitrary label may have a security level of "secret" and be associated with compartment "orange." The second arbitrary label may have a security level of "top secret" and be associated with compartments "red" and "blue." If the first data object is combined with the second data object to create a composite data object, then a label associated with the composite data object may include the security information of both the first data object and the second data object. In other words, the composite data object may be associated with a label that has a security level of "top secret" and is associated with compartments "orange," "red," and "blue." Such a label combination is difficult to make if the first arbitrary label is in a label format that is incompatible with that of the second arbitrary label. However, the label conversion system 400 may make the combination by first converting each of the arbitrary labels into universal labels and then generating a label for the composite data object.

According to an aspect of the invention, one or more of the respective components of the label conversion system 400 may include or be associated with one or more control units that are configured to control the operation of the components. FIG. 5 is a block diagram of a control unit 500 that may be utilized by respective components of the label conversion system 400 of FIG. 4, according to an illustrative embodiment of the invention. The control unit 500 may include a memory 505 that stores programmed logic 515 (e.g., software) in accordance with the invention and a processor 510. The memory 505 may also include data 520 utilized in the operation of the invention and an operating system 525. The data 520 may include information communicated to the control unit 500 by other components of the label conversion system 400. The processor 510 may utilize the operating system 525 to execute the programmed logic 515, and in doing so, may also utilize at least a portion of the data 520. A data bus 530 may provide communication between the memory 505 and the processor 510. Users may interface with the control unit 500 via a user interface device(s) 535 such as, for example, a keyboard, mouse, or any other device(s) capable of communicating digital data to the control unit 500. The control unit 500 may be in communication with other components of the label conversion system 400, and perhaps other external devices, via an I/O Interface 540. The control unit 500 may be integrated into a respective component of the label conversion system 400, though it will be understood that the control unit 500 may not be integrated into a respective component of the label conversion system 400 and may even be located remotely to a respective component of the label conversion system 400. Further the control unit 500 and the programmed logic 515 implemented thereby may include software, hardware, firmware or any combination thereof.

FIG. 6 is a schematic diagram of a heterogeneous network 600 that may convert and evaluate data object labels and subject labels, according to an illustrative embodiment of the invention. The heterogeneous network 600 may include a policy manager 402 and one or more network hosts 605, 610. Two exemplary hosts 605, 610 are depicted in FIG. 6; however, it will be understood that any number of hosts may be included in the heterogeneous network 600. The components of the heterogeneous network 600 may be in communication with one another via a network 615 such as, for example, a local area network (LAN), a campus area network (CAN), a metropolitan area network (MAN), a wide area network (WAN), or the Internet. Additionally, each of the hosts 605, 610 may be associated with one or more controlled interfaces or gateways that may control the data that a host 605, 610 is permitted to receive from and or transmit to other components of the heterogeneous network 600. As shown in FIG. 6, a first controlled interface 617 may be associated with the first host 605 and a second controlled interface 618 may be associated with the second host 610.

It will be understood that one or more components of the heterogeneous network 600 may include or be associated with a control unit, such as the control unit 500 depicted in FIG. 5. As shown in FIG. 6, the policy manager 402 may incorporate a control unit that includes a processor 620, a memory 625, a network interface 630, and one or more I/O interface(s) 635. Each of these control unit components may function in a similar manner to the respective components described above for the control unit 500 of FIG. 5.

As shown in FIG. 6, the heterogeneous network 600 may also include one or more databases 640 that are configured to store the conversion rules 445 and/or the evaluation rules 450. The database(s) 640 may be in communication with one or more components of the heterogeneous network 600. For example, the database(s) 640 may be in communication with the policy manager 402. The database(s) 640 may be a central storage location for the heterogeneous network 600. It will be appreciated that the conversion rules 445 and/or the evaluation rules 450 stored in the database(s) may be dynamically updated as the security policy implemented within the heterogeneous system is updated or changed. For example, if a new host is added to the heterogeneous network, the rules stored in the database(s) may be updated. As another example, if an existing host implements a new security policy or security system, the rules stored in the database(s) may be updated. It will further be appreciated that a portion or all of the conversion rules 445 and/or evaluation rules 450 may additionally or alternatively be stored by one or more other memories associated with the heterogeneous network 600. For example, a portion of the conversion rules 445 and/or evaluation rules 450 may be stored in the memory 625 of the policy manager 402.

According to an aspect of the invention, the processing of labels may be distributed among multiple components of the heterogeneous network 600. In a typical prior art information assurance system, a controlled interface is often the controlling point for data moving into and out of a system, and the controlling interface performs data inspection, validation, and filtering before allowing data objects to be delivered to requesting subjects. The controlled interface may be the only visible element between two systems or portions of a single system. As such, the performance of the system is often limited to that of the performance of the controlled interface. By distributing the processing of labels among multiple components in accordance with an aspect of the invention, the overall performance of the heterogeneous network 600 may be improved. Accordingly, delays in accessing secured data within the heterogeneous network 600 may be reduced. Thus, if the policy manager 402 performs the functions of a typical controlling interface, the performance of the heterogeneous network 600 may not be limited to the performance of the policy manager 402. In accordance with an embodiment of the invention, label conversion, label evaluation, and data filtering may be distributed among multiple components of the heterogeneous network 600 in support of a request for a data object.

According to an aspect of the invention, one or more software applications or software objects may be distributed to various components of the heterogeneous network 600. For example, the one or more software applications may be distributed to the first host 605 and the second host 610. The one or more software applications may facilitate the distributed processing of data object requests such as, for example, evaluation and combination. It will be appreciated that the one or more software applications may be any appropriate software applications such as, for example, Application Programmer Interface (API) software applications or stand alone software applications. As shown in FIG. 6, a security API may be distributed to the various hosts 605, 610 of the heterogeneous network 600. The security API's may be compatible with various programming languages and computer systems. Additionally, the security API may be integrated or implemented into software programs such as, for example, security programs, that are executed by or accessed by the various hosts 605, 610. For example, a security program that is executed by a first host 605 may obtain one or more software objects associated with the security API. Alternatively, a programmer or user of the security program that is executed by the first host 605 may obtain the one or more software objects associated with the security API and incorporate their functionality into that of the security program. It will be appreciated that the incorporation of security API's into various security programs may facilitate communication among one or more incompatible security programs.

As shown in FIG. 6, a first security API 645 may be associated with the first host 605, and a second security API 650 may be associated with the second host 650. Each security API 650, 655 may incorporate or include a label maker module and a label evaluator module. For example, the first security API 645 may include a first label maker 655 and a first label evaluator 660, and the second security API 650 may include a second label maker 665 and a second label evaluator 670. The label makers 655, 665 may operate in a similar manner to the label makers 405, 410 of FIG. 4. Accordingly, the label makers 655, 665 may convert arbitrary labels into universal labels. The label evaluators 660, 670 may conduct evaluations and/or combinations of one or more universal labels. It will be appreciated that overall system performance of the heterogeneous network 600 may be improved by conducting label conversions, label evaluations, and/or label combinations at the various hosts security API's 645, 650 of the heterogeneous network 600. In other words, the overall performance of the heterogeneous network 600 may be increased because one or more controlled interfaces 617, 618 to the heterogeneous network 600 are not required to filter data, perform label conversions, perform label evaluations, and/or perform label combinations. Accordingly, network communication delays such as, for example, latency delays, at the one or more controlled interfaces 617, 618 may be minimized. It will also be appreciated that a security API 645, 650 may only allow access to, communicate, or transmit data objects for which dominance has been established. Any data objects that are communicated from one component of the heterogeneous network 600 to another component of the heterogeneous network 600 may be communicated through one or more controlled interfaces 617, 618 of the heterogeneous network 600. It will further be appreciated that any communicated data objects may additionally or alternatively be communicated through a central controlled interface. For example, the policy manager 402 may function as a central controlled interface for the heterogeneous network 600.

According to an aspect of the invention, a centralized security policy may be utilized by the heterogeneous network 600. Label conversions, evaluations, and/or combinations may be conducted in accordance with the centralized security policy. The centralized security policy may be maintained by the policy manager 402 and utilized by other components of the heterogeneous network 600. The centralized security policy may utilize conversion rules 445 and/or evaluation rules 450 that are accessible by other components of the heterogeneous network 600. The conversion rules 445 and/or evaluation rules 450 may be obtained from other components of the heterogeneous network 600 to facilitate label conversions, evaluations, and combinations in a distributed manner on the heterogeneous network 600.

According to an aspect of the invention, applications, systems, and/or networks may join the heterogeneous network 600 through a discovery process. An application such as, for example, a security program running on the first host 605, may initiate a discovery process to locate other security software within the heterogeneous network 600. It will be appreciated that any appropriate discovery process may be utilized such as, for example, discovery processes that use multicast or unicast methods to locate other instances of security software within the heterogeneous network 600. Once other instances of security software have been located, an application may join the security fabric of the heterogeneous network 600 and make itself available to perform security services For example, a security program running on the first host 605 may initiate a discovery process in order to locate other security software. Once other security software is located and/or identified, the security API 645 of the first host 605 may join the security fabric of the heterogeneous network 600 and make itself available to conduct security services such as, for example, label conversion and evaluation.

FIG. 7 is an exemplary flowchart of a method for performing a label conversion, according to an illustrative embodiment of the invention. It will be understood that a label maker such as, for example, the label maker 405 of FIG. 4 or the label maker 655 of FIG. 6, may perform a label conversion utilizing the method depicted in FIG. 7. For purposes of describing the method of FIG. 7, reference will be made to the label maker 655 of FIG. 6. At step 705, an arbitrary label may be received. The arbitrary label may be formatted according to many different types of label formats. After the arbitrary label is received, the label maker 655 may go to step 710. At step 710, the label maker 655 may obtain one or more relevant conversion rules 445 for converting the arbitrary label into a universal label. The one or more relevant conversion rules 445 may be obtained from the policy manager 410. Once the one or more relevant conversion rules have been obtained at step 710, then the label maker 655 may go to step 715. At step 715, the one or more relevant conversion rules 445 may be utilized to convert the arbitrary label into a universal label.

It will be understood that after the arbitrary label is received, the label maker 655 may optionally go to step 720. At step 720, the label maker 655 may convert the arbitrary label into a label having the new label format 200. The label maker 655 may add one or more markers to the arbitrary label in order to generate a label having the new label format 200. The one or more markers may be added based on information included in or referenced by the arbitrary label and/or on one or more relevant conversion rules 445. The one or more relevant conversion rules 445 may be obtained from the policy manager 410. If a label having the new label format 200 is generated at step 720, then the label having the new label format will be converted into a universal label at step 715.

It will be appreciated that the steps described and shown in FIG. 7 may be carried out or performed in any suitable order. It will also be appreciated that not all of the steps described in FIG. 7 need to be performed in accordance with the this embodiment of the invention and/or that additional steps may be performed in accordance with other embodiments of the invention.

An example of a label conversion utilizing the method of FIG. 7 will described. FIG. 8A is a table that depicts exemplary rules for a label conversion, according to an illustrative embodiment of the invention. FIG. 8A depicts exemplary mapping rules for converting either an arbitrary label or a label having the new label format 200 into a universal label. The mapping rules of FIG. 8A may be utilized to determine the content of the fields of a generated universal label based on the information contained in the fields of an arbitrary label or label having the new label format 200. For example, with reference to FIG. 5A, an arbitrary label having a security level equal to "1" would map to a universal label having a security level equal to "127" and compartments "34," and "36." As another example, a label having a new label format 200 that has an originator field value equal to "3" would map to a universal label having compartments "38" and release markings "100" and "400." It will be understood that more than one conversion rule 445 may apply to the conversion of a label into a universal label. For example, with reference to FIG. 8A, an arbitrary label may include information in both an originator field and in a security level field, thereby invoking at least two relevant conversion rules 445.

FIG. 8B is a block diagram illustrating an exemplary label conversion, according to an illustrative embodiment of the invention. FIG. 5B illustrates the conversion of an object label 425 into a universal object label 430. The illustrated object label 425 may have a version field, an originator field, and a security level field. As shown, the version field is equal to "23," the originator field is equal to "1," and the security level field is equal to "1." By applying one or more of the exemplary conversion rules 445 depicted in FIG. 8A, the object label 425 may be converted into a universal object label 430. It will be appreciated that the one or more conversion rules depicted in FIG. 5A may be applicable for the conversion of labels having a version field value of "23." In an exemplary conversion, a first conversion rule may specify that an originator value of "1" in the object label 425 requires that the release markings of "100" and "200" be set in the universal object label 430. Such a rule may be used if a security system that utilizes Version 23 labels allows data objects marked with an originator value of "1" to be viewed by organizations specified by release markings "100" and/or "200." A second conversion rule may specify that a security level value of "1" in the object label 425 is converted to a security level of "127" in a universal object label 430 and that compartments "34" and "36" are required. In other words, a subject attempting to access a data object associated with the universal object label 430 may be required to have a security level of "127" or higher and may further be required to be associated with compartments "34" and "36." Based on the one or more relevant conversion rules 445, the object label 425 may be converted into a universal object label 430.

For a subject to gain data access rights to a data object, a label associated with the subject and a label associated with the data object may undergo an evaluation process. FIG. 9 is an exemplary flowchart of a method for evaluating labels, according to an illustrative embodiment of the invention. For example, the label evaluator 660 associated with the first host 605 of FIG. 6 may perform a label evaluation process according to the method of FIG. 9. At step 905, a label evaluator 660 may receive a request for the evaluation of two labels. The label evaluator 660 may also receive one or more labels to be evaluated. At step 910, the label evaluator 660 may cause the subject label to be converted into a universal subject label. For example, the label evaluator 660 may send the subject label to a label maker 655 so that it will be converted. At step 915, the label evaluator 660 may cause the object label to be converted into a universal object label. Following the conversion of the subject label and the object label, the label evaluator 660 may go to step 920. At step 920, the label evaluator 660 may determine whether or not an evaluation of the two universal labels may be made. If it is determined at step 920 that an evaluation of the two universal labels cannot be made, then the label evaluator 660 may go to step 925 and return an error message to the application, system, network, or user that requested the evaluation. However, if it is determined at step 920 that an evaluation of the two universal labels can be made, then the label evaluator 660 may go to step 930. At step 930, the label evaluator 660 may determine whether or not dominance is established by the universal subject label over the universal object label. For example, the label evaluator 660 may determine whether the security level associated with the universal subject label is equal to or greater than the security level associated with the universal object label, and the label evaluator 660 may determine whether the compartments and release markings of the universal subject label match those of the universal object label. If it is determined at step 930 that dominance is established by the universal subject label, then the label evaluator 660 may return an evaluation result of "pass," which may allow the subject associated with the universal subject label to access the data object associated with the universal object label. If, however, it is determined at step 930 that dominance is not established by the universal subject label, then the label evaluator 660 may return an evaluation result of "fail," which may prevent the subject associated with the universal subject label from accessing the data object associated with the universal object label.

It will be appreciated that the steps described and shown in FIG. 9 may be carried out or performed in any suitable order. It will also be appreciated that not all of the steps described in FIG. 9 need to be performed in accordance with this embodiment of the invention and/or that additional steps may be performed in accordance with other embodiments of the invention.

It will be appreciated that one or more components of the heterogeneous network 600 may store any number of labels. The stored labels may be arbitrary labels, labels formatted according to the new label format 200, and/or universal labels. It will be appreciated that it may be advantageous to store one or more universal labels at certain components of the heterogeneous network 600. For example, one or more universal labels may be stored in a cache or other memory device for later use. Stored universal labels may then be accessed or looked up using a proxy identifier method. For example, a subject proxy identifier may be used to look up or access a universal subject label, as will be understood by those of skill in the art. The use of proxies to access or look up universal labels may reduce the number of labels that need to be converted or created, thereby contributing to a potential increase in the performance of the heterogeneous network 600.

An example of a situation in which it might be advantageous to use one or more proxies is a financial transaction. Sensitive financial information may be protected as a secure data object with an associated universal object label. Various subjects such as, for example, a customer, a merchant, and/or a financial institution may then attempt to access the data object during the course of the transaction. It will be appreciated that a single subject label may be generated for the various subjects and cached for later use. When a subject seeks access to the data object, the subject may communicate a proxy rather than a subject label and the proxy may be utilized to retrieve the universal subject label. It will be appreciated that any identifier may be utilized as a proxy. In the present example, a unique transaction identifier or subject identifier may be used as a subject proxy.

FIG. 10 is an exemplary flowchart of an alternative method for evaluating labels, according to an illustrative embodiment of the invention. The alternative method of FIG. 10 is similar to that of FIG. 9; however, the alternative method of FIG. 10 utilizes a subject proxy. At step 1005, a label evaluator 660 may receive a request to evaluate an object label and a subject identifier. At step 1010, the label evaluator 660 may look up the universal subject label by utilizing the subject identifier. At step 1015, the label evaluator 660 may cause the object label to be converted into a universal object label. Following the lookup of the universal subject label and the conversion of the object label, the label evaluator 660 may go to step 1020. At step 1020, the label evaluator 660 may determine whether or not an evaluation of the two universal labels may be made.

If it is determined at step 1020 that an evaluation of the two universal labels cannot be made, then the label evaluator 660 may go to step 1025 and return an error message to the application, system, network, or user that requested the evaluation. However, if it is determined at step 1020 that an evaluation of the two universal labels can be made, then the label evaluator 660 may go to step 1030. At step 1030, the label evaluator 660 may determine whether or not dominance is established by the universal subject label over the universal object label. For example, the label evaluator 660 may determine whether the security level associated with the universal subject label is equal to or greater than the security level associated with the universal object label, and the label evaluator 660 may determine whether the compartments and release markings of the universal subject label match those of the universal object label. If it is determined at step 1030 that dominance is established by the universal subject label, then the label evaluator 660 may return an evaluation result of "pass," which may allow the subject associated with the universal subject label to access the data object associated with the universal object label. If, however, it is determined at step 1030 that dominance is not established by the universal subject label, then the label evaluator 660 may return an evaluation result of "fail," which may prevent the subject associated with the universal subject label from accessing the data object associated with the universal object label.

It will be appreciated that the steps described and shown in FIG. 10 may be carried out or performed in any suitable order. It will also be appreciated that not all of the steps described in FIG. 10 need to be performed in accordance with this embodiment of the invention and/or that additional steps may be performed in accordance with other embodiments of the invention.

In accordance with some embodiments of the invention, an evaluation of two labels may be made without first converting the labels into universal labels. In such a situation, one or more relevant conversion rules 445 may be utilized to perform an evaluation of the two labels on a field by field basis. For example, the security level fields of both labels may be converted into a compatible or universal format and then compared with one another.

According to an aspect of the invention, a data object may be stored in a manner in which security information is embedded into the data object. A continuous data object of an arbitrary size, also referred to as the data payload, may be stored with embedded security information, a secure checksum, and a cryptographic signature of the checksum. The embedded security information may include one or more security labels, as described above and/or one or more instructions pertaining to how particular elements of the data payload should be processed in a secure manner. It will be appreciated that the data payload may include any type of data, may be of any size, and may include encrypted data.

FIG. 11 is a block diagram illustrating a data storage structure 1100, according to an illustrative embodiment of the invention. The data storage structure 1100 may include security information 1105, a data payload 1110, a secure hash or checksum 1115, and a cryptographic signature 1120, as will be understood by those skilled in the art. It will be appreciated that the components of the data storage structure 1100 may be arranged in any appropriate order. The secure checksum 1115 may be computed based on the composite of the data payload 1110 and the security information 1105, and the secure checksum 1115 may provide a redundancy check to protect the integrity of the data. The cryptographic signature 1120 may be appended to the data storage structure 1100 by any appropriate method such as, for example, pretty good privacy (PGP), public key infrastructure (PKI), etc. The cryptographic signature 1120 may be appended in such a way that modification of the data payload 1110, security information 1105, and/or secure hash or checksum 1115 may be detectable. It will be appreciated that the secure checksum 1115 and/or the cryptographic signature 1120 may also be replicated or alternatively stored to a separate medium or storage system such as, for example, to an index or metadata object or database. In such cases, it will be appreciated that alternative storage of the secure checksum and/or the cryptographic signature may provide a secondary, or backup, repository of security information or be utilized in a search for data matching specific security parameters.

According to another aspect of the invention, a data object may be read or written to in a secure manner that is transparent to an application performing an Input/Output (I/O) operation. A data object with an associated object label may be read in a series of bytes either singly or in a streaming manner. Security information 1105 associated with the data object may be detected while the data object is read, and the security information 1105 may be evaluated against a security label associated with a subject. If dominance is established by the subject label, then the data object may be released to the requesting subject. In the event that a portion of the data contained within a data object is not allowed for release to the requesting subject, a filtering operation may be performed and only the data for which the subject has authorized access may be released to the requesting subject. Alternatively, if the subject only has authorized access to a portion of the data object, the overall security policy may dictate that no portion of the data object will be released to the subject. A similar process or method may be utilized during a write operation of the data. Additionally, it will be appreciated that if a data object does not contain explicit security labels or security markings, implicit security information or labels may be assigned to the data object according to environment information associated with the data object, as discussed in greater detail above with reference to FIG. 4.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for electronically managing data rights, the method comprising:
   receiving a first label associated with a data object;
   obtaining one or more predefined rules for the conversion of the first label to a first universal label having a universal format; and
   converting the first label into the first universal label at least in part by electronically mapping information associated with the first label to one or more data fields associated with the first universal label utilizing the one or more predefined rules,
   receiving a second label associated with a subject seeking access to the data object;
   converting the second label into a second universal label having the universal format based at least in part on one or more predefined rules for the conversion of the second label into the second universal label;
   evaluating the first universal label and the second universal; and
   determining whether the subject is allowed to access the data object based at least in part on the evaluation,
   wherein the above operations are performed by one or more computers.

2. The method of claim 1, further comprising:
   associating one or more markers with the first label prior to converting the first label into the first universal label.

3. The method of claim 2, wherein associating one or more markers with the first label comprises associating one or more markers comprising data associated with one or more of a version of the first label, declassification information for the first label, or originator information for the first label.

4. The method of claim 1, further comprising:
   selecting the one or more predefined rules for the conversion of the first label from a plurality of potential conversion rules.

5. The method of claim 4, wherein selecting the one or more predefined rules for the conversion of the first label comprises selecting based at least in part on security information associated with the first label.

6. The method of claim 4, wherein selecting the one or more predefined rules for the conversion of the first label comprises selecting based at least in part on environmental information associated with the data object.

7. The method of claim 1, wherein evaluating the first universal label and the second universal label comprises comparing a first security level associated with the first universal label to a second security level associated with the second universal label.

8. The method of claim 1, wherein the first label is formatted according to a first security policy and the second label is formatted according to a second security policy; and
   wherein the first security policy is different from the second security policy.

9. The method of claim 1, wherein the data object comprises dynamically generated data.

10. A system for electronically managing data rights, the system comprising:
    at least one database configured to store one or more predefined rules for the conversion of labels to universal labels having a universal format;
    one or more label makers configured to (i) receive a first label associated with a data object, (ii) obtain one or more predefined rules from the at least one database for the conversion of the first label into a first universal label, (iii) convert the first label into the first universal label based at least in part on the one or more predefined rules, (iv) receive a second label associated with a subject seeking access to the data object, (v) obtain one or more predefined rules from the at least one database for the conversion of the second label to a second universal, and (iii) convert the second label into the second universal label; and
    a label evaluator configured to (i) receive the first universal label and the second universal label from the one or more label makers, (ii) evaluate the first universal label and the second universal label, and (iii) determine, based at least in part upon the evaluation, whether the subject is allowed to access the data object.

11. The system of claim 10, wherein:
    the one or more predefined rules stored in the at least one database are dynamically updated.

12. The system of claim 10, wherein the one or more label makers are further configured to associate one or more markers with the first label prior to converting the first label into the first universal label.

13. The system of claim 12, wherein the one or more markers comprise data associated with one or more of a version of the first label, declassification information for the first label, or originator information for the first label.

14. The system of claim 10, wherein an entity associated with the at least one database is configured to select the one or more predefined rules for the conversion of the first label from a plurality of potential conversion rules.

15. The system of claim 14, wherein the entity selects the one or more predefined rules for the conversion of the first label based at least in part on security information associated with the first label; and
   wherein the security information associated with the first label is communicated to the entity by the one or more label makers.

16. The system of claim 14, wherein the entity selects the one or more predefined rules for the conversion of the first label based at least in part on environmental information associated with the data object; and
   wherein the environmental information associated with the data object is communicated to the entity by the one or more label makers.

17. The system of claim 10, wherein the evaluation of the first universal label and the second universal label comprises a comparison of a first security level associated with the first universal label to a second security level associated with the second universal label.

18. The system of claim 10, wherein the first label is formatted according to a first security policy and the second label is formatted according to a second security policy; and
   wherein the first security policy is different from the second security policy.

19. The system of claim 10, wherein the one or more label makers comprise (i) a first label maker configured to convert the first label into the first universal label and (ii) a second label maker configured to convert the second label into the second universal label.

20. A method comprising:
   receiving a first label associated with a data object;
   converting, based at least in part upon a first set of one or more predefined conversion rules, the first label to a first universal label having a universal format;
   receiving a second label associated with a subject seeking access to the data object;
   converting, based at least in part upon a second set of one or more predefined conversion rules, the second label into a second universal label having the universal format;
   evaluating the first universal label and the second universal; and
   determining, based at least in part upon the evaluation, whether the subject is allowed to access the data object,
   wherein the above operations are performed by one or more computers.

* * * * *